March 8, 1932. G. A. UNGAR 1,848,147
PORTABLE SHEARS
Filed Oct. 20, 1927  3 Sheets-Sheet 1

INVENTOR
GUSTAVE A. UNGAR
BY Lotka, Kehlenbeck & Harley
ATTORNEYS

March 8, 1932.　　G. A. UNGAR　　1,848,147
PORTABLE SHEARS
Filed Oct. 20, 1927　　3 Sheets-Sheet 2
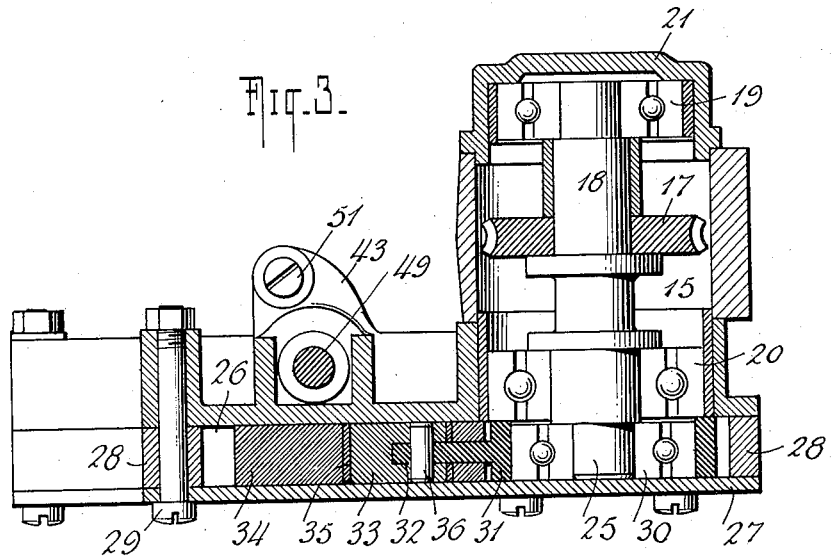
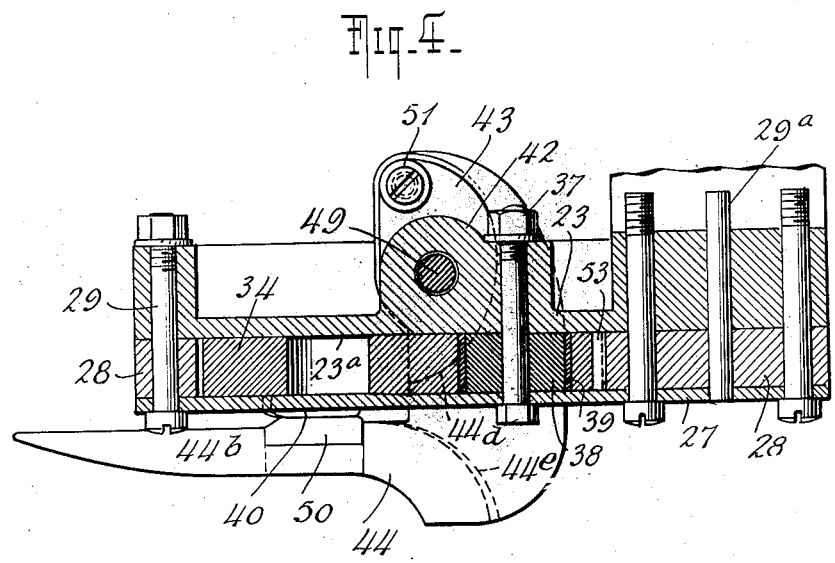
INVENTOR
GUSTAVE A. UNGAR
BY Lotka, Kehlenbeck Harley
ATTORNEYS

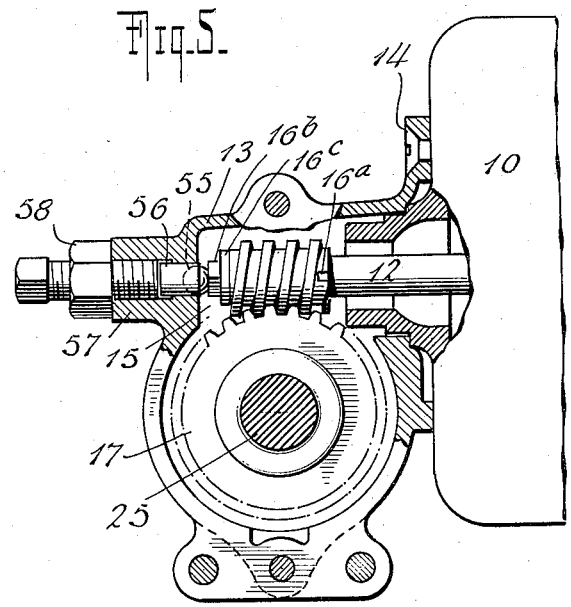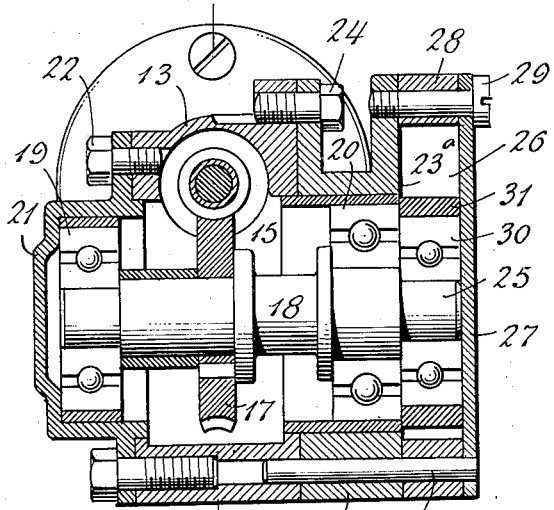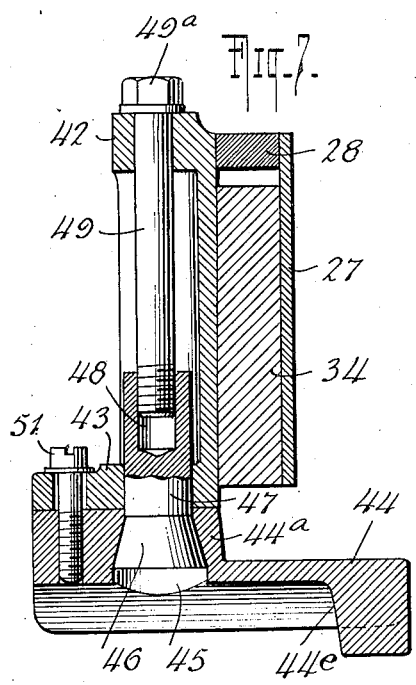

Patented Mar. 8, 1932

1,848,147

UNITED STATES PATENT OFFICE

GUSTAVE A. UNGAR, OF PELHAM MANOR, NEW YORK

PORTABLE SHEARS

Application filed October 20, 1927. Serial No. 227,388.

This invention relates to power driven portable shears of the type adapted to be held in the hands of the operator while they are manipulated to perform the cutting operations.

The principal object of the invention is to provide a new and improved construction for an easily handled light weight shears capable of cutting curved and straight lines with equal facility, of cutting sheet metal the thickness of which is relatively large for the size of the tool and also capable of attaining a relatively high output or rate of cut in feet per minute.

A further object is to provide a construction for such a shears that will be of marked simplicity and great durability so that while they may be manufactured and sold at a comparatively low cost, they will nevertheless stand up under the rough usage to which such tools are subjected under shop or factory working conditions.

Another important object of the invention is to so construct and arrange the driving mechanism relatively to the cutting blades that complete and full visibility of the work at the cutting point may be obtained irrespective of the position in which the shears are held.

A further object is to so construct the shears that the connecting parts between the movable and fixed blades will offer the minimum obstruction to the free movement of the work sheet when either straight or curved outlines are to be cut.

Another object is to provide a shears so constructed and arranged that danger of injury to the operator in the use thereof is practically entirely obviated.

Figure 1:
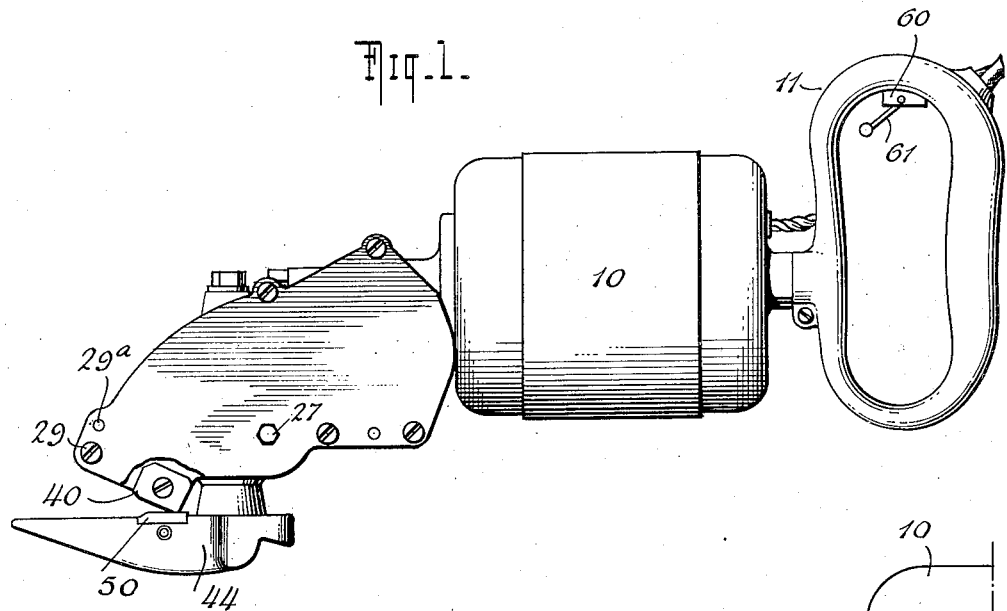
Figure 2:
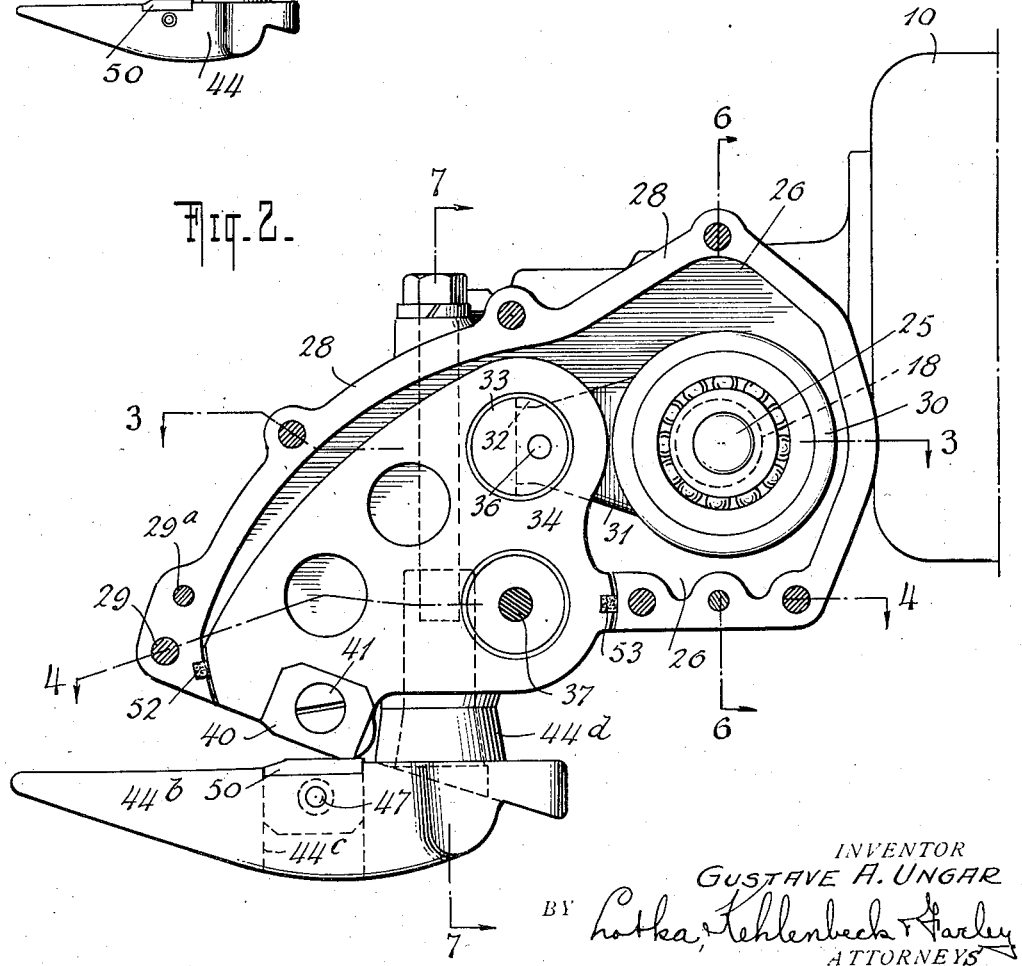

These and other objects such, for example, as relate to the attractiveness and neatness of the appearance of the device, ready replacement and adjustment of the parts thereof, will appear more fully from the following more detailed description and by reference to the accompanying drawings forming a part hereof and wherein Fig. 1 is a side elevation of a machine constructed in accordance with the principles of my invention; Fig. 2 is an enlarged side elevation of a portion of the shears with the cover plate removed from the housing which contains the movable blade carrier and a portion of the actuating mechanism therefor; Figs. 3 and 4 are horizontal sections taken on the lines 3—3 and 4—4 of Fig. 2; Fig. 5 is a section on the line 5—5 of Fig. 6 and Figs. 6 and 7 are vertical sections taken on the lines 6—6 and 7—7 of Fig. 2.

As shown in the drawings, the machine comprises an electric motor 10 to one end of which is secured a handle 11. The armature shaft 12 of the electric motor 10 is extended beyond the other end of said motor and projects into a bracket member 13, see Fig. 5, which is secured by means of the screws 14 to the end of the casing of the motor 10. The bracket member 13 serves as a support for a number of additional bracket and cover plate members which together with the member 13 define a housing and oil reservoir for a reduction gearing and the other movable parts which serve to actuate the movable shear blade. As clearly shown in Figs. 5 and 6 of the drawings, the member 13 is cored out to provide a chamber or oil reservoir 15 in which the reduction gearing is mounted. Said reduction gearing consists of a worm 16 and a worm wheel 17. The worm is secured to the armature shaft in any suitable way as for example by the key $16^a$ and a small clamping bolt $16^b$ screwed into the end of the armature shaft and clamping the worm against a shoulder of said shaft, a washer $16^c$ preferably being interposed between the head of said bolt and said worm. The worm wheel is secured upon an eccentric or crank shaft 18 journaled in a pair of antifriction bearings 19, 20, the bearing 19 being seated within a cover plate 21 bolted to one of the side faces of the bracket member 13 by the bolts 22, while the bearing member 20 is mounted within a bearing bracket 23, which is bolted to the other side face of the bracket member 13 by means of the bolts 24. The crank shaft 18 has an eccentric throw 25 which projects outwardly beyond the bearing 20 and into a housing space 26 defined between the side wall $23^a$ of the bearing bracket 23 and a cover plate 27. A spacer 28 extends about the major portion of the periphery of the side wall 23ª and said spacer is provided at spaced intervals with apertures through which pass the bolts 29 which are screwthreaded into the bearing bracket 23 and serve to hold the cover plate 27 and spacer 28 secured to the bracket member 23; one or more dowel pins 29ª which pass through the spacer, bearing bracket and cover plate are also preferably provided for convenience in locating the parts in proper position in the assembling of the device.

As will be seen from Fig. 6 of the drawings, the eccentric throw 25 of the shaft 18 is located in the space 26 and engages within a ball or other antifriction bearing 30. The bearing 30 is mounted within a large apertured boss provided at one end of a connecting link 31. The other end of the link 31 is reduced in thickness (see Fig. 3) and seats within a slot 32 provided in a rocking pin or block 33. The block 33 fits rotatably within a suitable aperture provided in a movable blade carrier 34, a liner or bushing 35 being interposed between the blade carrier and block 33. As will be seen most clearly in Fig. 2 of the drawings, the reduced end of the link 31 is squared and seats snugly against the inner end of the slot 33, the contacting surfaces of said end and slot providing a relatively large surface area over which the thrust of the link is distributed to the movable blade carrier 34 when the movable cutting blade, presently to be described, is performing its cutting stroke. A small connecting pin 36 passes through the reduced end of the link 31 and the block 33 and said pin serves to connect the movable blade carrier to the link in such a way as to insure that movement of the blade carrier which raises the movable blade during the inactive part of its stroke. The construction of the above parts is substantially the same as disclosed and claimed in my copending application Serial No. 192,811, filed May 20, 1927.

The movable blade carrier 34 is mounted for oscillation about a pivot pin or bolt 37 which passes through the cover plate 27 and the bearing bracket 23. For the purpose of providing a large wearing surface, a wear block 38 is mounted upon the bolt 37 and within the aperture provided in the blade carrier, a bushing 39 being interposed between said aperture and the wear block 38.

The blade carrier 34 fits with a neat sliding fit between the side wall 23ª of the bearing bracket 23 and the inner face of the cover plate 27 and said blade carrier is provided at its lower end with a suitable recess in which is seated a movable cutting blade 40, a screw 41 serving to hold said blade securely in position within said recess.

The bearing bracket 23 is provided on the side opposite the side wall 23ª thereof with a pair of laterally extending bosses or lugs 42, 43. Each of the lugs 42, 43 is provided with an aperture, said apertures being in vertical alignment (see Fig. 7) and serving to receive the means which are employed to secure to the device a stationary blade carrier 44. The blade carrier 44 is provided with an upwardly extending boss 44ª having a tapered hole 45 in which is received the enlarged tapered head 46 of a clamping nut 47. The nut 47 as clearly shown in Fig. 7 extends upwardly through the aperture of the lug 43 and the upper end of said nut is provided with a screw threaded bore 48 in which is received the lower threaded end of a clamping bolt 49. The bolt 49 passes through the aperture of the lug 42 and is provided with a bolt head 49ª adapted to bear upon the upper face of said lug 42.

The stationary blade carrier 44 has a forward extension 44ᵇ which on one side is vertically slotted out, as at 44ᶜ, to receive the stationary blade 50, said blade being secured within the slot 44ᶜ by means of a clamping screw 47.

The top face of the extension 44ᵇ of the stationary blade carrier 44 extends in parallelism with the cutting edge of the blade 50 and forms a supporting surface for the sheet material as it is fed to the cutting blades, while the lower face of the boss 44ª (see Fig. 2) extends in parallelism with the cutting edge of the movable blade 40. Immediately to the rear of the meeting points of the edges of the cutting blades 40 and 50 the rear face 44ᵈ of the boss 44ª and the rear face 44ᵉ of the extension 44ᵇ are curved sharply away in opposite directions from the vertical plane in which the cutting edges of the cutting blades are located. This is done to provide a clearance which permits relative rotation between the shears and the work about a vertical axis for cutting curved outlines. Rotation of the stationary blade carrier 44 about the axis of the nut 47 and bolt 49 permits the blade 50 to be adjusted relatively to the movable blade 40 and suitable means are provided for securing the carrier 44 in adjusted position. Such means is shown as consisting of a screw 51 threaded into the carrier 44 and passing through an aperture in the lug 43 of the bearing member 23, the aperture in said lug being large enough to permit an extent of movement of the carrier sufficient for the necessary adjustments.

As the compartments 15 and 26, in which the reduction gearing and the movable blade carrier respectively are housed, are preferably kept filled with oil or grease, packing strips 52, 53 are provided between the movable blade carrier at the lower ends thereof and the lower ends of the spacer 28, to prevent the escape of the lubricant.

For the purpose of providing a bearing for the outer end of the armature shaft 12 and also to take up the end thrust of the worm 16 the outer face of the head of the bolt 16<sup>b</sup> is provided with a small recess with which is adapted to engage a ball 55. The ball 55 is seated within a recess in the end of a take up screw 56 threaded into a boss 57 formed in the bracket member 13, a lock nut 58 being provided to hold the take up screw in adjusted position.

The handle 11 has inclosed therein an electric switch 60 having an actuating trigger 61 adapted to be readily actuated by a finger of the hand of the operator which grasps the handle 11.

The operation of the device is as follows: The switch 60, 61 being actuated to place the motor 10 in rotation, the rotation of said motor is communicated through the worm 16 and worm wheel 17 to the shaft 18. As the shaft 18 rotates the rotation of its eccentric or crank throw portion 25 will be communicated through the ball bearing 30 to the large apertured end of the connecting link 31 and will cause said end to describe a circular path of movement about the axis of the crank shaft 18. A portion of this movement of the link 31 will be communicated to the blade carrier 34 causing said blade carrier to oscillate about the axis of the bolt 37 while another portion of the movement of the link 31 will be dissipated in producing oscillation of the rocking pin or block 33 within its bearing in the blade carrier. As the blade carrier 34 oscillates about the bolt 37, the movable blade 40 will be moved to and from the stationary blade 50 with a stroke of relatively small amplitude. The cutting edges of the blades 40, 50, it will be noted, extend at an angle to each other, and the extent of movement of the blade carrier 34 and blade 40 is such that only a relatively small portion of the cutting edges of the blades 40, 50 are effective to perform an actuating stroke so that an open throat is at all times maintained between the cutting edges into which the work may be continuously fed. The speed of the motor 12 and the ratio of the reduction gearing 16, 17 is such that a very rapid reciprocation or oscillation of the movable blade is produced.

When it is desired to adjust the relative positions of the blades 40, 50, the bolt 49 and screw 51 are loosened to permit movement of the normally stationary blade carrier 44 about the axis of the bolt 49 thereby to adjust the blades to the proper cutting clearance.

While I have shown the bolt 49 which secures the stationary blade carrier to the tool as having its axis parallel to the plane in which the cutting edge of the movable blade is located it will be obvious that the bolt could be arranged differently, as, for example, at right angles to such plane, without departing from the principles of my invention. Cuts having curved outlines can be made as easily as straight cuts because of the clearance spaces provided at the rear of the curved faces 44<sup>d</sup> and 44<sup>e</sup> of the boss 44<sup>a</sup> and extension 44<sup>b</sup> respectively and also because of the small amplitude of the cutting stroke, the latter obviating any binding of the work sheet by the blades which would tend to prevent relative rotation between the work sheet and the device about a vertical axis and the construction and arrangement of the curved faces as well as the construction, arrangement, and location of the driving mechanism and motor being such that a free unobstructed space is provided to the rear of the cutting blades and on both sides of the vertical plane of the cutting edges thereof, thereby permitting free movement between the cut portions of the work and tool without any interference or obstruction. By referring to Figs. 1 and 4 of the drawings and particularly to Fig. 4 it will be noted that the cutting edges of the blades 40, 50, are located in a plane which lies to one side of the plane of the outer face or wall of the cover plate 27, or, in other words, the cutting edges of the blades project laterally beyond the side wall of the housing and no part of the housing projects over the cutting edges, consequently a free and unobstructed view of the work at the place of cutting is assured. This is a very important advantage of the invention the obtaining of which is in part made possible by the arrangement of the pivotal mounting of the movable blade carrier and the actuating mechanism for such blade carrier rearwardly of the cutting edges and also by locating both the actuating mechanism for the movable blade, and the connection of the stationary blade carrier to the housing or to the framework of the tool, to one side of cutting edges of the blades.

As will be seen from Figs. 1 and 2 the cutting blades 40, 50 are located at the inner end of the V-shaped opening provided between the extension 44<sup>b</sup> of the blade carrier 44 and the housing members for the upper movable blade, consequently the cutting edges of said blades are in a position such that there is no possibility of danger of injury to the operator or danger of the movable blade accidentally catching in the operator's clothing or in any other material. Important advantages are secured as a result of certain constructional features of the particular shears selected for illustration. For example: it will be noted by referring to Fig. 2, that the axis of the fixed pivot 37 upon which the movable blade carrier is mounted is located upon a line which extends from the point of intersection of the blades at an angle of about 120° to the plane of the work sheet, the latter for the best cutting results being held substantially in parallelism with the line which bisects the angle between the blades; for convenience this plane is referred to in certain of the claims as the "work plane". While the 120° angle shown is prefered for general all around cutting, such angle may however be varied between 90° and 150° the smaller angle producing a greater feeding action upon the work and a more gradual cut per stroke and the greater angle a lesser feeding action but quicker cut per stroke. Likewise, it will also be noted, by referring to Fig. 4 that the axis of the clamping bolt 49 is located on a line extending from the blade intersection at an angle of 120° to the plane in which the cutting edge of the movable blade reciprocates; the latter plane will be referred to in certain of the claims as the "cutting plane". This angle may also be varied between the 120° angle shown and 150°. It is important however that in varying the position of the clamping bolt relatively to the blades that said bolt be maintained as shown in the drawings with its axis parallel to the cutting plane and perpendicular to the cutting edge of the stationary blade. It is also important that the axis of the clamping bolt be located between the cutting blades and the axis of the fixed pivot 37.

By referring to Fig. 2 it will be seen that the lower face of the projection 44$^b$ of the stationary blade carrier 44 is curved upon a radius the center of which coincides with the point of intersection of the blades said lower face of such projection therefore forming a support for the front end of the tool, so that when during a cutting operation the latter is supported, for example, on a work bench, the point of support is always immediately below the zone of cutting action even though the angle of the tool to the work bench is varied. The distance between this point of support and the blades is moreover such that the blades and work sheet are always maintained above the bench an amount sufficient to permit the ready passage of the cut portions of the work without obstruction thereof by the work bench.

In addition, the tapered configuration of the projection 44$^b$ and the point-like termination of its front end enables the operator to thrust said front end readily under a work sheet when a cutting operation is to be started, thus obviating the necessity of raising the sheet by hand and inserting it between the blades.

While the device has been shown in the drawings in a position such that the housing and movable blade carrier are vertical with the cutting blades located at the lowermost point of the tool, such position being the one in which the tool will be generally held when it is used as a portable tool, it will be obvious that the tool may be used in many different positions. In fact it is devised for use with a saddle attachment by means of which the tool is clamped in position for use as a fixed device with the cutting blades located at the top, therefore it will be understood that such expressions as "top", "bottom", "above" and "lower" whether contained in the specification or claims, or merely used in a relative sense for convenience and clarity of description and not in a restrictive sense.

It will be understood that many changes, variations and modifications of the constructional details of the device as herein disclosed may be resorted to without departing from the spirit of my invention.

I claim:

1. A portable shears comprising an electric motor, a housing secured to one end of said motor and having an opening in axial alignment with the axis of said motor through which the armature shaft of said motor projects, a crank shaft journalled in said housing at right angles to said armature shaft, a movable blade carrier pivotally mounted in, and substantially completely enclosed by, said housing and having a small projection extending through a second opening of said housing, a movable cutting blade secured to said projection of said blade carrier, a link connection between said crank shaft and movable blade carrier pivotally secured to the latter, the pivotal connection of said link connection and the movable cutting blade being in line on a line passing to one side of the pivot of said movable blade carrier whereby the pressure necessary to perform the cutting stroke is exerted as a compressive force directly on said movable blade carrier along the aforesaid line, a stationary blade carrier mounted on said housing and having an extension located adjacent to said movable blade carrier, and a stationary cutting blade secured to said stationary blade carrier.

2. A portable shears as set forth in claim 1 in which packing is interposed between the housing and the movable blade carrier to prevent the escape of lubricant from said housing, the movable blade carrier being of generally triangular form.

3. A portable shears as set forth in claim 1 in which the stationary blade carrier is connected to the housing by a clamping bolt the axis of which extends in a plane substantially parallel to the plane in which are located the cutting edges of the cutting blades, said blade carrier being adapted to be swung about the axis of said bolt for adjusting the side clearance between the movable and the stationary cutting blades.

4. A portable shears as set forth in claim 1 in which the stationary blade carrier is connected to the housing by a clamping bolt the axis of which extends in a plane substantially parallel to the plane in which are located the cutting edges of the cutting blades, said blade carrier being adapted to be swung about the axis of said bolt for adjusting the side clearance between the movable and the stationary cutting blades and means additional to said clamping bolt are provided for holding said stationary blade carrier in adjusted position.

5. A portable shears comprising an electric motor, a housing secured thereto having an opening through which the armature shaft of said motor projects into said housing, said housing projecting beyond said motor and having a second opening, a movable blade carrier pivotally mounted in, and substantially completely enclosed by, said housing and having a small projection extending through said second opening, a movable blade secured to said blade carrier and movable through said opening in the direction of its cutting stroke a connection from said motor pivotally connected with said movable blade carrier at a point in line with said movable blade on a line passing to one side of the pivot of said movable blade carrier whereby the pressure necessary to perform the cutting stroke is exerted as a compressive force directly on said movable blade carrier along the aforesaid line, a stationary blade carrier secured to said housing and having a extension projecting across and spaced from said second opening and a stationary blade secured to said stationary blade carrier, the adjacent faces of said movable blade carrier, said housing, and the extension of said stationary blade carrier forming an open V-shaped throat at the inner end of which the cutting blades are located.

6. A portable shears comprising a pair of cutting blades having their cutting edges inclined to each other to provide an open throat into which the work may be fed continuously, means for imparting to one of said blades a rapid stroke of small amplitude, said means including an electric motor a reduction gearing and a movable blade carrier; a housing and a stationary blade carrier projecting outwardly beyond the cutting edges of said blades at the open end of said throat and forming protective means for preventing accidental contact with the cutting edges of said blades, said movable blade carrier being pivoted in said housing, and said motor being connected with said movable blade carrier at a point in line with said movable blade on a line passing to one side of the pivot of said movable blade carrier whereby the pressure necessary to perform the cutting stroke is exerted as a compressive force directly on said movable blade carrier along the aforesaid line.

7. A portable shears comprising an electric motor, a housing member secured to one end of said motor and having an opening in axial alignment with the armature shaft of said motor, a bearing bracket secured to said housing member, a cover plate secured to said bearing bracket, a spacer located between said cover plate and bearing bracket for holding them in spaced relationship, said cover plate and bearing bracket forming a pair of spaced guideways located to one side of and in parallelism with the axis of the motor, a crank shaft journalled in said housing member and bearing bracket, reduction gearing between said crank shaft and armature shaft, a movable blade carrier mounted for oscillation between said spaced guideways, a connection link between said blade carrier and crank shaft pivotally secured to said blade carrier, a stationary blade carrier detachably secured to said bearing bracket and a pair of cutting blades, one secured to said movable blade carrier and the other secured to said stationary blade carrier, the pivot of said link connection being in line with said movable blade on a line passing to one side of the oscillation point of said movable blade carrier whereby the pressure necessary to perform the entering stroke is exerted as a compressive force directly on said movable blade carrier along the aforesaid line.

8. In a shears, of the type wherein a movable cutting blade and a stationary cutting blade have their cutting edges inclined at an angle to provide an open throat to which the work may be fed continuously, and a motor and actuating mechanism connected with said motor and said movable blade imparts a rapid stroke of small amplitude to said movable blade; a stationary blade carrier detachably associated with said motor, said blade carrier having a boss, a clamping member cooperating with said boss for securing said blade carrier to the shears, said boss having a substantially vertical curved face terminating at one end adjacent to the intersection of said cutting blades and curving away from the vertical plane in which said intersection is located, and said carrier being further provided with a work supporting surface extending substantially in parallelism with the cutting edge of said stationary blade, a second curved face located below said work supporting surface, terminating at one end adjacent to said intersection and curving away from said plane in a direction opposite to said first named curved face, and a lower surface located substantially in parallelism with the cutting edge of said movable blade.

9. A portable shears comprising a movable cutting blade and means for imparting to it a rapid stroke of small amplitude, a stationary blade carrier and a cutting blade mounted thereon, and means for adusting the relative lateral positions of said blades; comprising a clamping bolt for said blade carrier, the axis of said bolt extending parallel to the plane in which are located the cutting edges of said cutting blades.

10. A portable shears comprising a movable blade carrier and means for imparting to it a rapid stroke of small amplitude upon a fixed pivot, a stationary blade carrier, a cutting blade mounted on each of said carriers and clamping means for adjustably securing said stationary blade carrier, about a pivotal axis, said axis being located between said fixed pivot and said cutting blades.

11. A portable shears comprising a movable blade carrier and means pivotally connected with said movable blade carrier for imparting to it a rapid stroke of small amplitude upon a fixed pivot, a stationary blade carrier, a pair of cutting blades, one secured to each of said carriers, having their cutting edges inclined to each other to form an open throat into which the work may be continuously fed, said fixed pivot being located to one side of a line passing through the movable blade and the pivotal connection of said means with the movable blade carrier, whereby the pressure necessary to perform the cutting stroke is exerted as a compressive force directly on said movable blade carrier along the aforesaid line.

12. A portable shears comprising a movable blade carrier and means pivotally connected with said movable blade carrier for imparting to it a rapid stroke of small amplitude upon a fixed pivot, a stationary blade carrier, a pair of cutting blades, one secured to each of said carriers, having their cutting edges inclined to each other to form an open throat into which the work may be continuously fed, said fixed pivot being located to one side of a line passing through the movable blade and the pivotal connection of said means with said movable blade carrier, whereby the pressure necessary to perform the cutting stroke is exerted as a compressive force directly on said movable blade carrier along the aforesaid line.

13. A portable shears comprising a movable blade carrier and means pivotally connected with said movable blade carrier for imparting to it a rapid stroke of small amplitude upon a fixed pivot, a stationary blade carrier, a pair of cutting blades, one secured to each of said carriers, having their cutting edges inclined to each other to form an open throat into which the work may be continuously fed the pivotal connection of said means with said movable blade carrier being located in line with each other on a line passing to one side of said fixed pivot whereby the pressure necessary to perform the cutting stroke is exterted as a compressive force directly on said movable blade carrier along the aforesaid line, and means for securing said stationary blade carrier adjustably upon an axis located upon a line passing through the intersection of said blades and extending at an angle of not less than 120° or more than 150° to the cutting plane.

14. A portable shears comprising a movable blade carrier and means for imparting to it a rapid stroke of small amplitude upon a fixed pivot, a stationary blade carrier, a pair of cutting blades, one secured to each of said carriers, having their cutting edges inclined to each other to form an open throat into which the work may be continuously fed, and means for mounting said stationary blade carrier for adjustable swinging movement about an axis extending in parallelism to the cutting plane and perpendicular to the cutting edge of the stationary blade.

15. A portable shears comprising a movable cutting blade and means for imparting to it a rapid stroke of small amplitude, a stationary blade carrier and a cutting blade mounted thereon, said stationary blade carrier having a projection, the upper surface of which extends substantially parallel to the cutting edge of the stationary cutting blade and the lower face of which is curved immediately below the cutting blade, said lower curved portion merging with a tapered portion inclined at an acute angle to said upper face thereby forming a sharp point-like extremity on said projection in front of said cutting blades.

In testimony whereof I have hereunto set my hand.

GUSTAVE A. UNGAR.

DISCLAIMER 1,848,147.—*Gustave A. Ungar*, Pelham Manor, N. Y. PORTABLE SHEARS. Patent dated March 8, 1932. Disclaimer filed October 19, 1940, by the assignee, *The Stanley Works*.

Hereby disclaims claim 8 of said Letters Patent.

[*Official Gazette November 26, 1940.*]